Patented Dec. 18, 1923.

1,477,951

UNITED STATES PATENT OFFICE.

NATHAN GRÜNSTEIN, OF FRANKFORT-ON-THE-MAIN, GERMANY.

METHOD OF REGENERATING MERCURY CATALYST.

No Drawing.   Application filed March 16, 1920. Serial No. 366,237.

*To all whom it may concern:*

Be it known that I, NATHAN GRÜNSTEIN, a citizen of Lithuania, and resident of Frankfort-on-the-Main, Germany, have invented certain new and useful Improvements in Methods of Regenerating Mercury Catalyst, of which the following is a specification.

My invention refers to catalytically active mercury compounds and more especially to a method for increasing the duration of activity of such compounds.

It is well known that the time during which mercury compounds used for the production of acetic aldehyde from acetylene preserve their catalytic activity is rather limited so that these mercury salts require a periodic regeneration which is very expansive and cumbersome.

I have now ascertained that the time during which these mercury compounds remain catalytically efficient, can be prolonged by introducing oxygen into the reaction liquids. I have further ascertained that the regeneration of the catalyzer takes place without the oxygen entering into any reaction worth speaking of with the acetic aldehyde which is formed from the acetylene.

To 500 grams sulphuric acid of 10 per cent 25 grams mercuric oxide are added and the temperature is brought to 70 degr. C. Into the mixture thus heated I introduce under stirring acetylene gas in excess having 20 per cent oxygen admixed to it. By aid of receivers cooled in a suitable manner and filled with water I remove from the gas mixture escaping the acetic aldehyde which has been formed and which may be carried back into the reaction vessel. To the escaping gas mixture a suitable quantity of fresh acetylene and oxygen is admixed.

Good results have been obtained in the presence of 10 to 40 per cent oxygen. I wish it to be understod, however, that the novel method is not limited to these figures, for in all cases the quantity of oxygen introduced must be such that no reaction worth speaking of will take place between the oxygen and the acetic aldehyde formed out of the acetylene.

The oxygen required may also be generated with advantage in the reaction liquid by acting thereon with an electric current. This electrolytic oxygen will cause an anodic oxidation of the mercury salt which is being converted into metallic mercury. By operating in this way the quantity of oxygen to be employed can easily be portioned by varying the current intensity. A corresponding quantity of oxygen can be generated within the reaction liquid either permanently or for a certain time only. I may however proceed in this manner that from time to time the introduction of acetylene is interrupted and the quantity of current required for regenerating the mercury is introduced. I may even carry out the production of acetic aldehyde from the acetylene and the regeneration of the catalyzer in separate vessels.

A further modification of the novel process consists therein that the mercury catalyzer is treated in the reaction liquid with molecular oxygen or with oxygen in statu nascendi in the presence of substances capable of transferring oxygen, such as for instance iron salts and vanadium compounds in different states of oxidation.

In carrying out the process under simultaneous electrolytic oxidation of the mercury salts reduced to metallic mercury I prefer proceeding as follows:

500 grams sulphuric acid of 10 per cent are heated with 50 grams mercuric oxide to about 70 to 80 degr. C., an excess current of acetylene being passed through the liquid. At the same time direct current of 0.5 to 1.0 amp. is caused to pass through the liquid by means of an anode consisting of a suitable metal such as platinum brought in contact with the metallic mercury which separates from the liquid. The cathode which may consist of lead is either preferably arranged in the liquid or also within a special chamber partitioned by a diaphragm. In the latter case the circulating quantity of gas gradually absorbs the hydrogen and is replaced from time to time by fresh acetylene.

The strength of the current is chosen so low that the contact of oxygen in the gas mixture does never amount to more than a few per cent (for instance 4 per cent) and on the other hand it should be high enough to provide that the velocity of absorption of oxygen does not diminish. It is thus possible to convert the acetylene into acetic aldehyde in an uninterrupted manner and with an almost quantitative output.

The process may be carried out in a similar manner with the addition of 15 grams of ferrous sulphate.

I claim:

1. In the production of acetaldehyde from acetylene in acid solution by means of catalytically acting mercury salts, the process of adding to the acetylene approximately 4—40% of oxygen and conveying the acetylene-oxygen-mixture through the reaction liqiud, whereby the catalytic activity of the mercury salts is prolonged without noticeable action of the oxygen upon the acetaldehyde.

2. In the production of acetaldehyde from acetylene in acid solution by means of catalytically acting mercury salts, the process of electrolytically generating in the liquid containing such mercury salts the quantity of oxygen required for the purpose.

3. In the production of acetaldehyde from acetylene in acid solution by means of catalytically acting mercury salts, the process of adding to the liquid containing such mercury compounds the quantity of oxygen required for the purpose in the presence of substances capable of transferring oxygen.

4. In the production of acetaldehyde from acetylene in acid solution by means of catalytically acting mercury salts, the process of adding to the liquid containing such mercury compounds the quantity of oxygen required for the purpose in the presence of iron salts.

5. In the production of acetaldehyde from acetylene in acid solution by means of catalytically acting mercury salts, the process of adding to the liquid containing such mercury compounds the quantity of oxygen required for the purpose in the presence of ferrous sulphate acting as catalyzer.

6. In the production of acetaldehyde from acetylene in acid solution by means of catalytically acting mercury salts, the process of electrolytically generating in the liquid containing such mercury compounds the quantity of oxygen required for the purpose in the presence of iron salt acting as catalyzer.

7. In the production of acetaldehyde from acetylene in acid solution by means of catalytically acting mercury salts, the process of electrolytically generating in the liquid containing such mercury compounds the quantity of oxygen required for the purpose in the presence of ferrous sulphate acting as catalyzer.

8. In the production of acetaldehyde from acetylene in acid solution by means of catalytically acting mercury salts, the process of introducing alternatively acetylene and oxygen in the reaction liquid.

9. In the production of acetaldehyde from acetylene in acid solution by means of catalytically acting mercury salts, the process of first introducing into the reaction liquid the acetylene and after interruption of the acetylene current electrolytically generating in the liquid the quantity of oxygen required for the oxidation of the mercury.

10. In the production of acetaldehyde from acetylene in acid solution by means of catalytically acting mercury salts, the process of the oxidation of the mercury by electrolytically generated oxygen in a vessel separate from the reaction vessel.

In testimony whereof I have signed my name to this specification in the presence of two subscribing witnesses.

NATHAN GRÜNSTEIN.

Witnesses:
 PFISTER HERRMUTH,
 HEINRICH REHMY.